United States Patent

Gilles

[11] 3,841,393
[45] Oct. 15, 1974

[54] AIR CONDITIONING APPARATUS

[75] Inventor: Theodore C. Gilles, Marshalltown, Iowa

[73] Assignee: Lennox Industries Inc., Marshalltown, Iowa

[22] Filed: Sept. 4, 1973

[21] Appl. No.: 394,042

[52] U.S. Cl. .............................. 165/22, 98/40 DL
[51] Int. Cl. ............................................. F24f 3/00
[58] Field of Search ........ 98/40 DL; 168/22, 80, 26, 168/27

[56] References Cited
UNITED STATES PATENTS

| | | | |
|---|---|---|---|
| 3,354,946 | 11/1967 | Dean, Jr. | 98/40 DL |
| 3,424,233 | 1/1969 | Meckler | 98/40 DL |

Primary Examiner—Charles Sukalo
Attorney, Agent, or Firm—Molinare, Allegretti, Newitt & Witcoff

[57] ABSTRACT

The present invention pertains to an air processing system for an enclosed area that includes a plenum, an air processing unit communicating with the plenum and responsive to a temperature sensing means, light fixtures for lighting the enclosed area, duct means for communicating outside air, return air in a path separate from the light fixtures and return air in heat exchange relationship with the light fixtures, damper means for controlling the passage of air through the duct means, and exhaust means for exhausting air from the plenum to the atmosphere. The damper means are constructed and arranged so as to maximize the use of heat from the light fixtures when additional heating capacity is required for the enclosed area and to discharge such heat from the light fixtures to the atmosphere in order to reduce the cooling requirement when cooling is required in the enclosed area.

11 Claims, 4 Drawing Figures

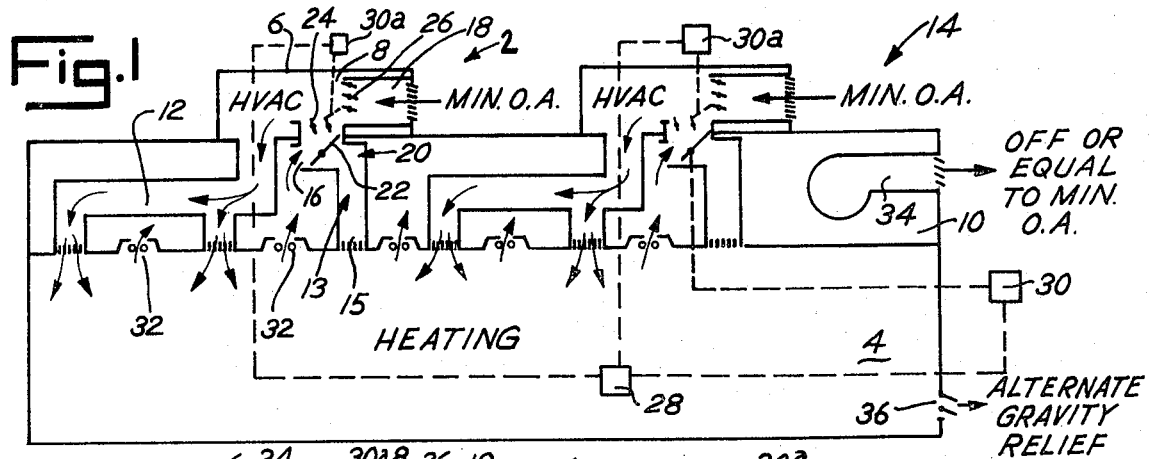
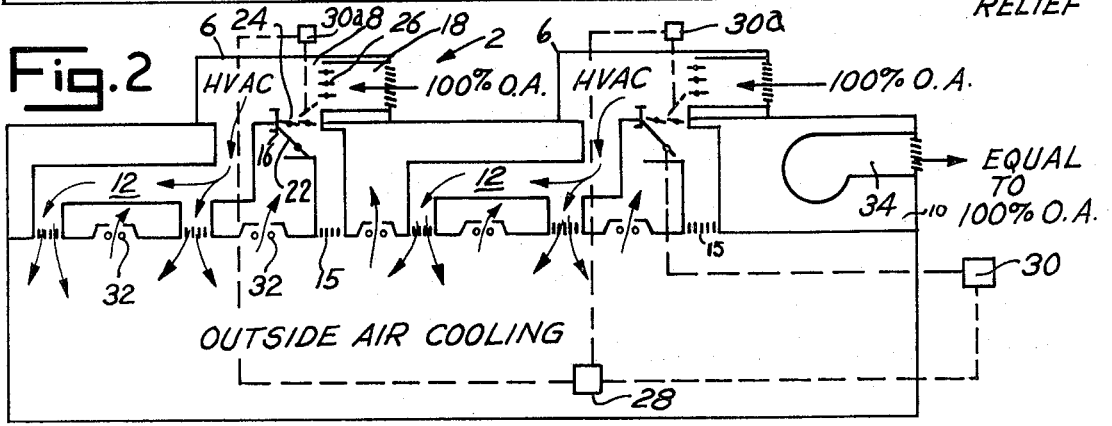
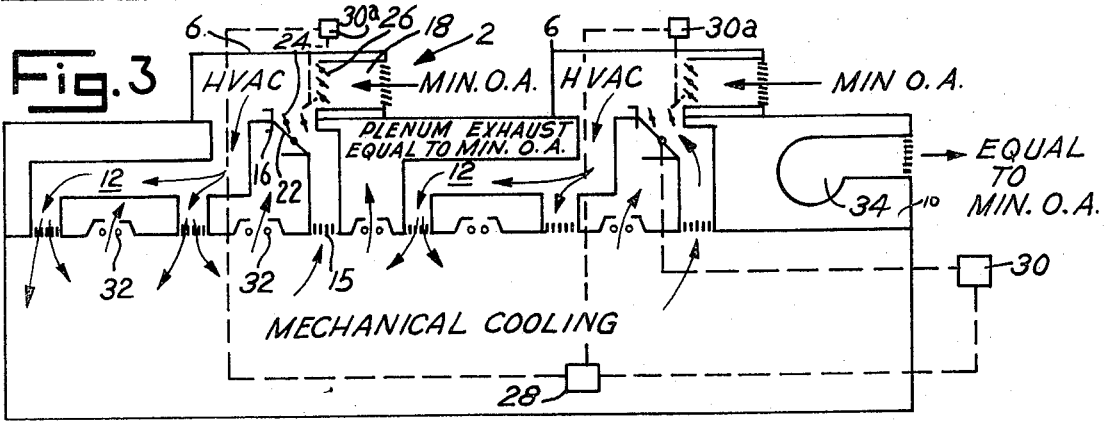
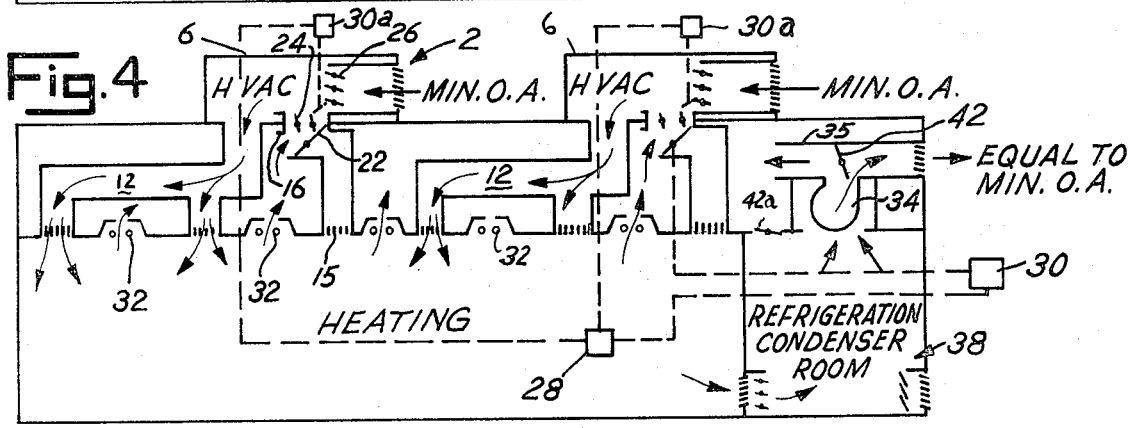

3,841,393

AIR CONDITIONING APPARATUS

BACKGROUND OF THE INVENTION

This invention relates generally to an air processing system, and more particularly, to a novel return air control system for use with a heating, cooling and ventilating unit for processing the air in an enclosed area.

Satisfactory air processing of the air in an enclosed area requires that the temperature of the air be kept within a relatively small temperature range. Air processing requirements will, of course, vary with the thermal load in the enclosed area.

Although achieving the desirable control of the air temperature within an enclosed area, presently known air processing systems are inefficient in certain respects. For example, in some of the presently known systems, heat gain within the enclosed area caused by lighting fixtures are virtually ignored. In the heating mode, this "heat of light" remains localized about the lighting fixture, and it is not used to heat the "lived in" in regions of the enclosed area. Thus, primary energy or mechanical heating is required, despite the fact that heat is readily available within the enclosed area. This additional primary energy heating significantly increases the operating cost of the air processing system.

In the cooling mode, the heat of light is again ignored. No attempt is made to lessen its adverse effect on room temperature. Additional mechanical cooling is, therefore, required to overcome this heat of light, which results in relatively high energy use and operating costs.

Additionally, outside air, in certain situations, provides an economical means for cooling an enclosed area. Many of the presently known air processing systems, however, are not properly equipped to use the outside air and instead mechanical cooling is utilized, with an attendant increase in operating costs.

Even in those systems equipped with "outside air cooling means" the inefficiencies, discussed above, limit this operation to periods of time when the outside air temperature is considerably below the desired room temperature. Generally speaking, present system generally operate in this mode only when the outside air temperature is less than about 56°F.

SUMMARY OF THE INVENTION

An object of the present invention is to provide a more efficient, less expensive air processing system, as compared with presently known air processing systems.

A further object of the present invention is to provide an improved air processing system wherein room and outside air conditions are used, whenever possible, to effect the processing of the room air, thereby reducing the operating costs of the air processing system.

Another object of the present invention is to provide an improved air processing system wherein the effect of adverse room air conditions is lessened, or alleviated, thereby reducing the amount of necessary mechanical air processing and the cost of such processing.

It is another object of the present invention to provide an improved air processing system wherein room air conditions including for example, the heat from light, and outside air conditions are utilized and controlled whereby the capacity of the air processing unit, and thus, the overall cost of the air processing system is reduced.

These objects and other which will become apparent from the detailed description which follows are accomplished by a novel return air system, including damper means, which controls the flow of air to the heating, cooling, and ventilating unit. This return air system allows the air processing system to (1) utilize conditions existing inside and outside the enclosed area in "preprocessing" the air and (2) alleviate the effect of such conditions when undesirable.

BRIEF DESCRIPTION OF THE DRAWINGS

A preferred embodiment of the present invention will be described in detail with the aid of the following drawing in which:

FIG. 1 shows a preferred embodiment of the present invention in the heating mode of operation;

FIG. 2 shows the system of FIG. 1 in the non-mechanical cooling mode of operation;

FIG. 3 shows the system of FIG. 1 in the mechanical mode of operation; and

FIG. 4 shows a modification of the present invention in the heating mode incorporating a separate refrigeration condenser room.

DESCRIPTION OF THE PREFERRED EMBODIMENT

Referring to FIGS. 1-3, a preferred embodiment of the present invention is shown as a air processing system, generally designated 2. The air processing system 2 conditions the air in an enclosed area or room 4.

The air processing system 2 includes a pair of conventional heating, cooling, and ventilating units 6 (hereinafter referred to as HVAC units 6). It is to be understood that this embodiment of the invention is only illustrative and any number of HVAC units 6 could be utilized. Additionally, the HVAC units 6 and their operation are the same and therefore, only one HVAC unit 6 will be described in detail.

HVAC unit 6 is located on the roof for example, and communicates with a plenum 10 such as the "sandwich space" between the ceiling and roof of a single story building (see FIG. 1) or between adjacent floors of a multi-story building (not shown). Processed air means or ducts 12 connect the HVAC unit 6 with the enclosed area 4. Registers or volume balancing dampers may be provided in the outlets from the ducts 12 to the area being treated.

A direct return air system, shown generally at 13, connects the air intake 8 of the HVAC unit 6 with the enclosed area 4, plenum 10, and the outside, shown generally at 14. These connections are made by room air means 15, plenum air means 16, and fresh air means 18, respectively.

The return air system 13 also includes control means 20 which regulate and control room air means 15, plenum air means 16, and fresh or outside air means 18. Control means 20 includes first damper means 22, second damper means 24, and third damper means 26. First damper means 22 selectively controls the flow through room air means 15 or plenum air means 16. Second damper means 24 regulates the flow through the selected duct or air means 15 or 16. Third damper means 26 regulates the flow through fresh air means 18. Thus, the air entering the HVAC unit 6 through the air intake 8, may, at any time, consist of room air, outside fresh air, plenum air, or selected combinations thereof.

The HVAC unit 6 and control means 20 are responsive to temperature sensing means 28. As shown schematically in FIG. 1, temperature sensing means 28 is a conventional thermostat disposed in the area to be treated. However, a differential temperature sensor, i.e., one which senses the temperature difference between inside and outside air, could be utilized. In either case, temperature sensing means 28 controls the mode of operation of the HVAC unit 6 and the setting of control means 20.

Control means 20 is operable in three states, depending upon the mode of the HVAC unit 6. In the heating mode, (shown in FIG. 1) the damper means 22, 24 and 26 are positioned so that room air means 15 is closed to passage of return air, plenum means 16 is opened and variably controlled by damper 24, and fresh air means 18 is variably opened by damper 26. In the non-mechanical cooling mode (FIG. 2) plenum air means 16 is restricted by damper 22, the flow through room air means 15 controlled by damper 24 shown closed, and fresh air means 18 is controlled by damper 26 that is shown open. In the mechanical cooling mode (FIG. 3), plenum air means 16 is closed by damper 22, the flow through room air means 15 is controlled by damper 24, and fresh air means 18 is controlled by damper 26.

The damper means of control means 20 are actuated by conventional motor means 30, 30a that are controlled by temperature sensing means 28. The damper means 24 and 26 may be interconnected for conjoint operation responsive to actuation of motor means 30a or if desired, each damper means may be separately actuated. When interconnected, as shown schematically in the drawing, the dampers 24 and 26 will operate conversely, that is, as one damper means is opened toward full open position, the other is closed by motor means 30a operating responsive to the temperature responsive means 28. Damper means 22 is ordinarily operative responsive to motor means 30 to open one or the other air means 15 or 16 to the air intake 8, and such air flow is variably controlled by damper means 24.

The air processing system 2 also includes a series of air passing lighting fixtures 32 and exhaust means 34. The air passing lighting fixtures 32 allows air to pass from the enclosed area 4 into the plenum 10 and are designed to recover and utilize the heat of light, which is produced from the lights themselves. Exhaust means 34 comprises a blower adapted to communicate to the atmosphere and provides means for exhausting air from the plenum 10. Thus, when exhaust means 34 is operating, air will be drawn from the enclosed area 4 through the air passing lighting fixtures 32 into the plenum 10.

Additionally, the air processing system 2 may include gravity relief means 36 in the enclosed area 4. Provision of the gravity relief means 36 results in a significant heat saving during the heating mode of operation, as discussed below.

In operation, temperature sensing means 28 determines the proper mode of operation for the HVAC unit 6 and actuates the control means 20. In the heating mode, as shown in FIG. 1, the majority of air entering the air intake 8 of the HVAC unit 6 comes from plenum 10. Third damper means 26 adjustably controls the amount of fresh outside air entering the air intake 8 for purposes of ventilation. For example, third damper means 26 can be adjusted to allow 10 percent outside air. The remaining 90 percent of air entering the air intake 8 will, therefore, come from the plenum 10. Damper means 22 is positioned so as to preclude air flow through room air means or ducts 15. Air from the enclosed area 4 passes through the air passing lighting fixtures 32 and through damper means 24 to air intake 8.

The air flow pattern established by the plenum 10, in this mode of operation, is a significant feature of the present invention, because the air passing through the lighting fixtures 32 will absorb the heat of light which surrounds these lighting fixtures 32. Thus, the room air will be pre-processed, or pre-heated, prior to entering the HVAC unit 6. This preliminary heating of the room air decreases the amount of primary energy heating required in the HVAC unit 6, and thus, reduces the operating cost of the air processing system 2.

During the heating mode, gravity relief means 36 is operative to compensate for the addition of outside air, and exhaust means 34 may be inoperative. The exhaust means 34 may be operative to compensate for the minimal amount of outside air drawn through damper means 26 for ventilation purposes. In this manner, cooler air adjacent the floor is exhausted and none of the pre-heated plenum air is exhausted, resulting in maximum saving of heat in the enclosed area 4.

Referring to FIG. 2, the air processing system 2 is shown in the non-mechanical cooling mode. That is, the cooling of the enclosed area 4 is accomplished by up to 100 percent outside air cooling, the mechanical cooling portion of HVAC unit 6 being inoperative. In this mode, exhaust means 34 operates at maximum capacity, such that up to 100 percent of the room air drawn through the air passing lighting fixtures 32 is exhausted.

This is a significant feature of the present invention because approximately 60 percent of the heat of light is exhausted by this operation. As a result, the air processing system 2 provides total non-mechanical cooling, i.e., 100 percent outside air cooling, up to outside air temperatures of 62°F or 63°F, as compared to the approximately 56°F for presently known air processing systems. This temperature increment represents substantial savings in the operating costs of the air processing system 2.

When the enclosed area 4 requires mechanical cooling, (FIG. 3) room air directly enters the air intake 8 of the HVAC unit 6. The air processing system 2 is therefore, a substantially closed system. Exhaust means 34, however, are operative at reduced capacity speed or volume in this mode, exhausting an amount of plenum air equal to the amount of outside air taken in through fresh air means 18. This exhausted air passes through the lighting fixtures 32, and thus, carries off much of the heat of light. This is, therefore, another significant feature of the present invention.

Elimination of heat of light, in this mode, substantially reduces the amount of mechanical cooling required by the HVAC unit 6, thereby reducing the operating cost of the air processing system 2. In addition, the necessary air conditioning capacity of the HVAC unit 6 is reduced. Thus, a smaller and less expensive HVAC unit 6 may be utilized.

Theoretical studies indicate that the present invention will result in substantial energy savings. A comparison of the present invention with a known prior art system for a 100,000 square foot store indicated savings of 31.9 percent for daytime operation in Los Angeles, California and 68.4 percent for night time operation in Los Angeles, California. Somewhat lesser though still significant savings result elsewhere, for example, in Dallas, Texas savings of 20.6 percent for daytime operation and 32.7 percent for night time operation.

Another advantage of the present invention results from the continuous ventilation of the lighting fixtures 32. This ventilation increases the output of the lighting fixtures 10 to 20 percent, as compared with unvented fixtures.

The air processing system 2 is also adaptable for use in conjunction with other types of systems. For example, the air processing system 2 may be combined with a refrigeration system, as shown in FIG. 4. The significant feature in this combination is that the heat rejected by the refrigeration system (in a supermarket, for example) is captured by the air processing system 2. Through use of damper 42 in the duct 35, the discharge of air from exhaust means 34 can be directed to the outside or alternately directed to plenum 10. In this manner, the air in the plenum 10 directed to air intake 8 is further pre-heated by the relatively warm air from the refrigeration condenser room, further reducing the amount of primary energy heating required to maintain the desired temperature in the enclosed area.

Another advantage of the present invention is that it can readily be adapted to clear smoke from a selected enclosed area in a building in the event of the detection of smoke resulting from a fire or the like. Suitable detectors responsive to the presence of smoke (or predetermined excessive temperature) in an enclosed area 4 are provided to override the thermostat means 28 for such enclosed area. The detectors are also interconnected with the blower in exhaust means 34 and may be operatively connected with the control means 20. When the presence of smoke is detected in such first enclosed area, the exhaust means opens fully to withdraw maximum air from the adversely affected enclosed area and the outside air means is opened fully to permit maximum flow of outside air to the enclosed area to effect maximum air turnover. There is a flow of outside air into adjacent areas with less withdrawal of air to pressurize same and thus prevent migration of smoke from the first area to other adjacent areas.

In some applications, utilizing multiple HVAC units, it is desirable to move heat of light from the core of the area being treated to the perimeter of the building or area being treated. The HVAC unit or units in the core or central region of the building may be adapted to receive only return air from the area being treated and outside air, with the heat of light from the core being carried through the plenum to the perimeter. There are less heat losses in the core region and therefore, core heat is transferred to the perimeter where there are higher heat losses. There is a significant savings in energy as a result of such operation of a system embodying the present invention.

While there has been shown and described a particular embodiment of the present invention, it is understood that there are changes and modifications that can be made without departing from the true spirit and scope of the invention.

What is claimed is:

1. An air processing system for an enclosed area comprising, in combination:
   a. a plenum;
   b. temperature sensing means;
   c. an air processing unit communicating with said plenum and responsive to said temperature sensing means, said air processing unit having an air intake;
   d. processed air means for directing the flow of processed air from said air processing unit to said enclosed area;
   e. air passing light fixtures between said enclosed area and said plenum for enabling air from said enclosed area to pass in heat transfer relationship with said light fixtures into said plenum;
   f. room air means for directing the flow of fresh air outside said enclosed area to said air intake of said air processing unit;
   g. fresh air means for directing the flow of fresh outside air to said air intake;
   h. plenum air means for directing the flow of air from said plenum to said air intake;
   i. control means for regulating said room air means, said fresh air means, and said plenum air means, said control means being responsive to said temperature sensing means; and
   j. exhaust means for exhausting air from said plenum said control means being operable in a heating state for closing said room air means, variably controlling said plenum air means, and variably controlling said fresh air means to minimum fresh air, said exhaust means being off or operative at as being operable in a heating state for closing said room air means, variably controlling said plenum air means, and variably controlling said fresh air means to minimum fresh air, said exhaust means being off or operative at minimum fresh air, operable in a first cooling state for controlling said room air means, closing said plenum air means, variably controlling said fresh air means to one-hundred percent fresh air, said exhaust means being operative to one-hundred percent fresh air, and operable in a second cooling state for variably controlling said room air means, closing said plenum air means, and variably opening said fresh air means to minimum fresh air, said exhaust means being operable to minimum fresh air.

2. The air processing system of claim 1 wherein said air processing system further comprises gravity relief means in said enclosed area.

3. The air processing system of claim 1 wherein said temperature sensing means senses the temperature of air within said enclosed area.

4. The air processing system of claim 1 wherein said temperature sensing means is a differential sensor sensing the temperature differential between air within said enclosed area and air outside said enclosed area.

5. The air processing system of claim 1 wherein said control means comprises first damper means, second damper means, and third damper means.

6. The air processing system of claim 5 wherein said first damper means selectively controls flow either from said room air means or said plenum air means, said second damper means regulates flow through said selected room air means or plenum means, and said third damper means controls said fresh air means.

7. The air processing system of claim 5 wherein said control means includes a motor means for actuating said damper means.

8. The air processing system of claim 7 wherein the second and third damper means are interconnected for conjoint operation by the motor means.

9. The air processing system of claim 8 wherein in a heating state the first damper means closes the room air means and flow to the air intake through the plenum air means from the enclosed area is variably controlled to vary the entry of fresh air; in a first cooling state the first damper means closes the plenum air means, the second damper means variably controls flow to the air intake through the room air means, the third damper means variably controls the entry of fresh air to one hundred percent fresh air; and in a second cooling state the first damper closes the plenum air means, the second damper means variably controls flow to the air intake through the room air means, the third damper means variably controls the entry of fresh air to minimum fresh air.

10. The air processing system of claim 9 wherein the exhaust means is operated complementary to the third damper means to exhaust quantities of air substantially equal to the fresh air introduced into the fresh air means.

11. An air processing system for a enclosed area, comprising in combination:
 a. a plenum;
 b. temperature sensing means;
 c. an air processing unit communicating with said plenum and responsive to said temperature sensing means, said air processing unit having an air intake;
 d. processed air means for directing the flow of processed air from said air processing unit to said enclosed area;
 e. air passing light fixures between said enclosed area and said enclosed plenum for enabling air from said enclosed area to pass in heat transfer relationship with said light fixtures into said plenum;
 f. room air means for directing the flow of air from said enclosed area to said air intake of said air processing unit;
 g. fresh air means for directing the flow of fresh outside air to said air intake;
 h. plenum air means for directing the flow of air from said plenum to said air intake;
 i. control means for regulating said room air means, said fresh air means, and said plenum air means, said control means being responsive to said temperature sensing means, said control means including first damper means, second damper means and third damper means, said first damper means selectively controlling flow either from said room air means or said plenum air means, said second damper means regulating flow through said selected room air means or plenum means, and said third damper means controlling said fresh air means; and
 j. exhaust means for exhausting air from said plenum, wherein in a heating state the first damper means closes the room air means and flow to the air intake to the plenum air means from the enclosed area is variably controlled to vary the entry of fresh air, in a first cooling state the first damper means closes the plenum air means, the second damper means variably controls flow to the air intake through the room air means, the third damper means variably controls the entry of fresh air to one-hundred percent fresh air; and in a second cooling state the first damper closes the plenum air means, the second damper means variably controls flow to the air intake to the room air means, the third damper means variably controls the entry of fresh air to minimum fresh air.

* * * * *

UNITED STATES PATENT OFFICE
CERTIFICATE OF CORRECTION

PATENT NO. : 3,841,393
DATED : October 15, 1974
INVENTOR(S) : Theodore C. Gilles It is certified that error appears in the above-identified patent and that said Letters Patent are hereby corrected as shown below:

Column 6, lines 33-37, Claim 1, delete: "said exhaust means being off or operative at as being operable in a heating state for closing said room air means, variably controlling said plenum air means and variably controlling said fresh air means to minimum fresh air,".

Signed and sealed this 24th day of June 1975.

(SEAL)
Attest:

RUTH C. MASON
Attesting Officer

C. MARSHALL DANN
Commissioner of Patents
and Trademarks